US012359881B2

(12) United States Patent
Park et al.

(10) Patent No.: US 12,359,881 B2
(45) Date of Patent: Jul. 15, 2025

(54) FLUID CLEANING APPARATUS

(71) Applicant: LG ELECTRONICS INC., Seoul (KR)

(72) Inventors: Hanyoung Park, Seoul (KR); Yoonjei Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1028 days.

(21) Appl. No.: 17/171,232

(22) Filed: Feb. 9, 2021

(65) Prior Publication Data

US 2021/0254909 A1 Aug. 19, 2021

(30) Foreign Application Priority Data

Feb. 17, 2020 (KR) ........................ 10-2020-0019267

(51) Int. Cl.
| | | |
|---|---|---|
| *F25D 17/04* | (2006.01) | |
| *B01D 33/17* | (2006.01) | |
| *B01D 33/48* | (2006.01) | |
| *F25B 25/00* | (2006.01) | |
| *F25B 49/02* | (2006.01) | |
| *F28D 7/16* | (2006.01) | |
| *F28F 9/02* | (2006.01) | |

(Continued)

(52) U.S. Cl.
CPC .............. *F28F 19/01* (2013.01); *B01D 33/17* (2013.01); *B01D 33/48* (2013.01); *F25B 25/005* (2013.01); *F25B 49/02* (2013.01); *F28D 7/1607* (2013.01); *F28F 9/0209* (2013.01); *B01D 2201/086* (2013.01); *F25B 2339/047* (2013.01); *F28D 2021/0068* (2013.01)

(58) Field of Classification Search
CPC .. F28F 19/01; F28F 9/0209; B01D 2201/086; B01D 33/17; B01D 33/48; F25B 25/005; F25B 49/02; F25B 2339/047; F28D 7/1607; F28D 2021/0068
USPC ......................................................... 62/317
See application file for complete search history.

(56) References Cited

FOREIGN PATENT DOCUMENTS

| | | |
|---|---|---|
| CN | 1488985 | 4/2004 |
| CN | 101568406 | 10/2009 |
| CN | 104487724 | 4/2015 |

(Continued)

OTHER PUBLICATIONS

Chinese Office Action dated Apr. 20, 2022 issued in Application No. 202110184757.0 (English translation attached).

(Continued)

*Primary Examiner* — Davis D Hwu
(74) *Attorney, Agent, or Firm* — KED & ASSOCIATES

(57) ABSTRACT

A fluid cleaning apparatus including: a first volume comprising a first inlet through which a first fluid is introduced and a first outlet through which the first fluid is discharged; a second volume comprising a second inlet through which a second fluid is introduced and a second outlet through which the second fluid is discharged; and a rotating wheel which is provided with a filter for filtering the first fluid, and rotatably positioned within the first volume and the second volume in a direction perpendicular to a flow direction of the first fluid or the second fluid, wherein foreign matter filtered while the first fluid passes through the filter in the first volume is discharged through the second outlet while the second fluid passes through the filter in the second volume, as the rotating wheel rotates.

20 Claims, 15 Drawing Sheets

(51) Int. Cl.
*F28F 19/01* (2006.01)
*F28D 21/00* (2006.01)

(56) References Cited

FOREIGN PATENT DOCUMENTS

| | | |
|---|---|---|
| KR | 20-0329577 | 10/2003 |
| KR | 10-2006-0046870 | 5/2006 |
| KR | 10-0770410 | 10/2007 |
| KR | 10-2018-0008128 | 1/2018 |
| KR | 10-1840554 | 3/2018 |
| KR | 10-1945778 | 2/2019 |
| WO | WO2007019535 * | 2/2007 |
| WO | WO 2011/042863 | 4/2011 |

OTHER PUBLICATIONS

Korean Office Action issued in Application No. 10-2020-0019267 dated Jan. 11, 2021.

* cited by examiner

[FIG. 1A]
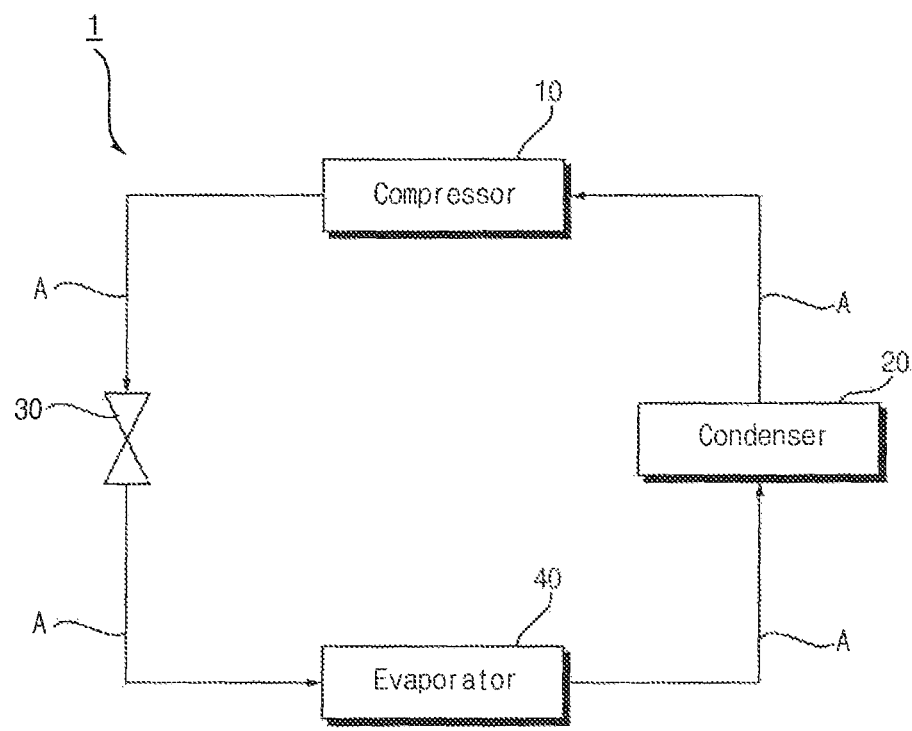
[FIG. 1B]
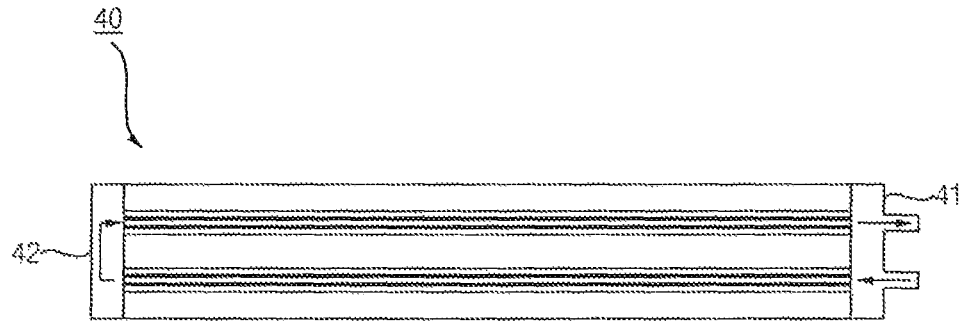

[FIG. 2]
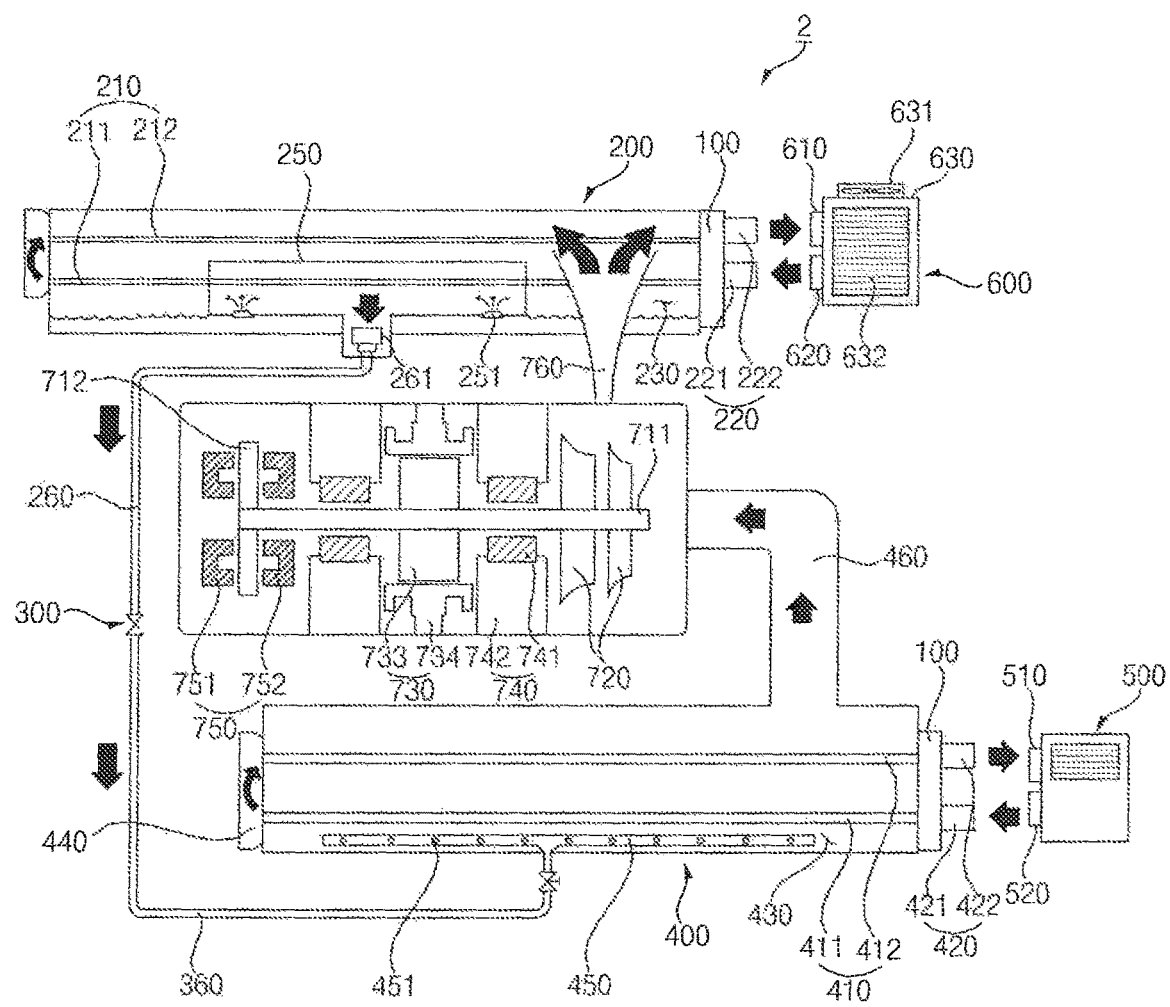

[FIG. 3]
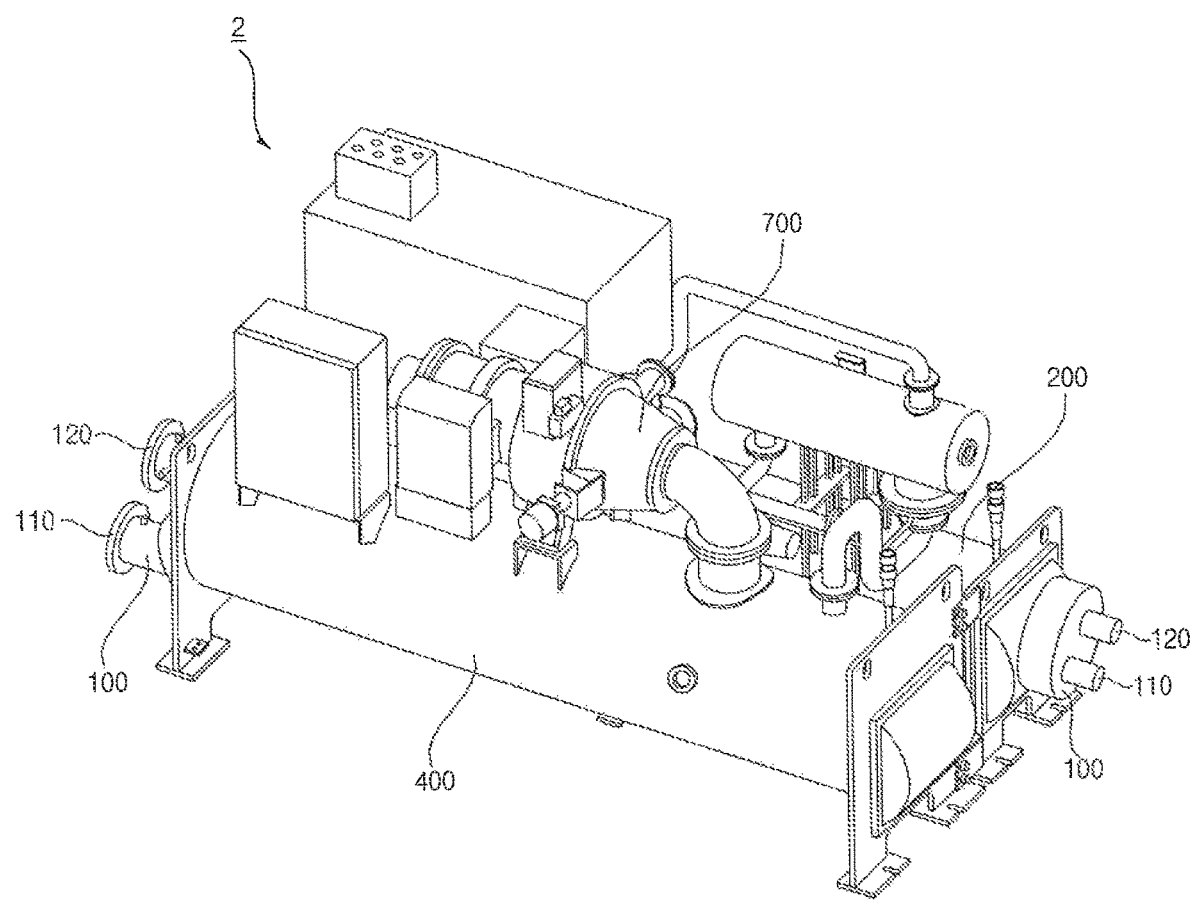

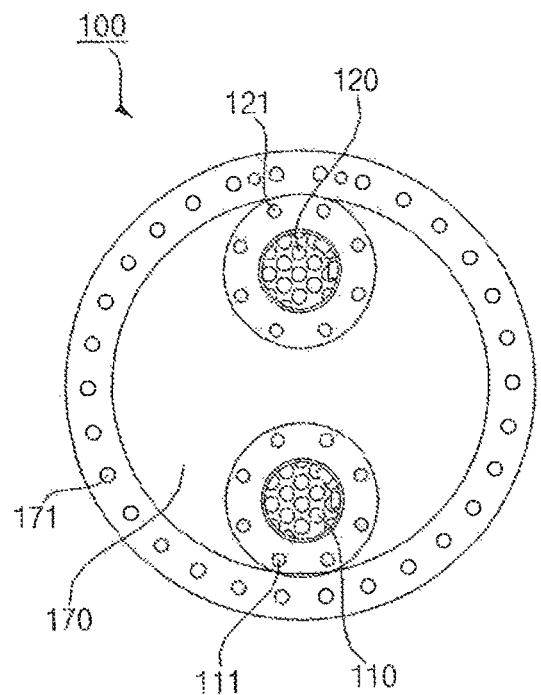
[FIG. 4A]
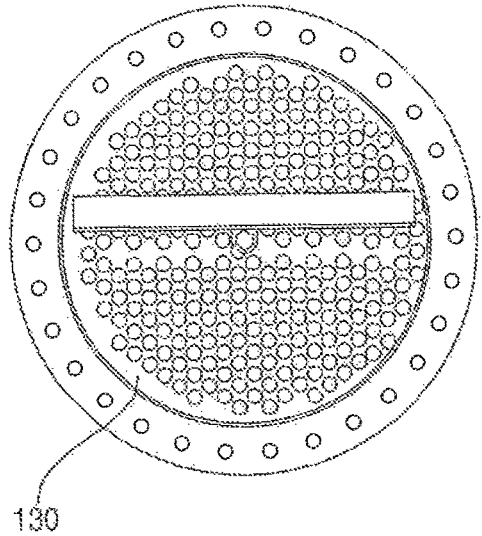
[FIG. 4B]
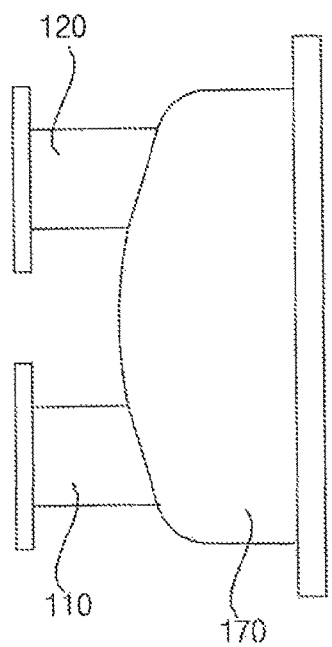
[FIG. 4C]
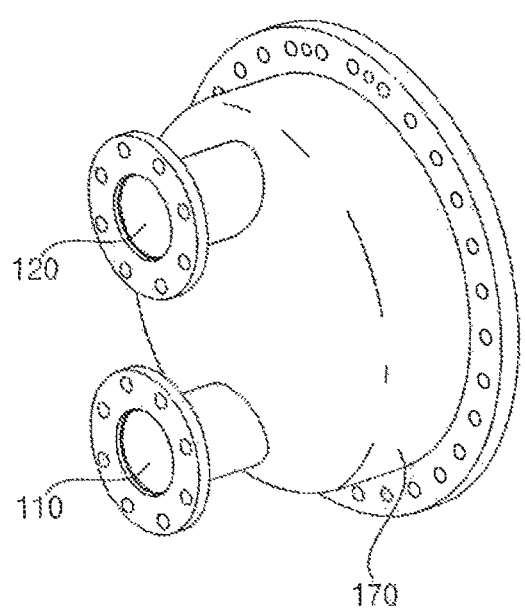
[FIG. 4D]

[FIG. 5]
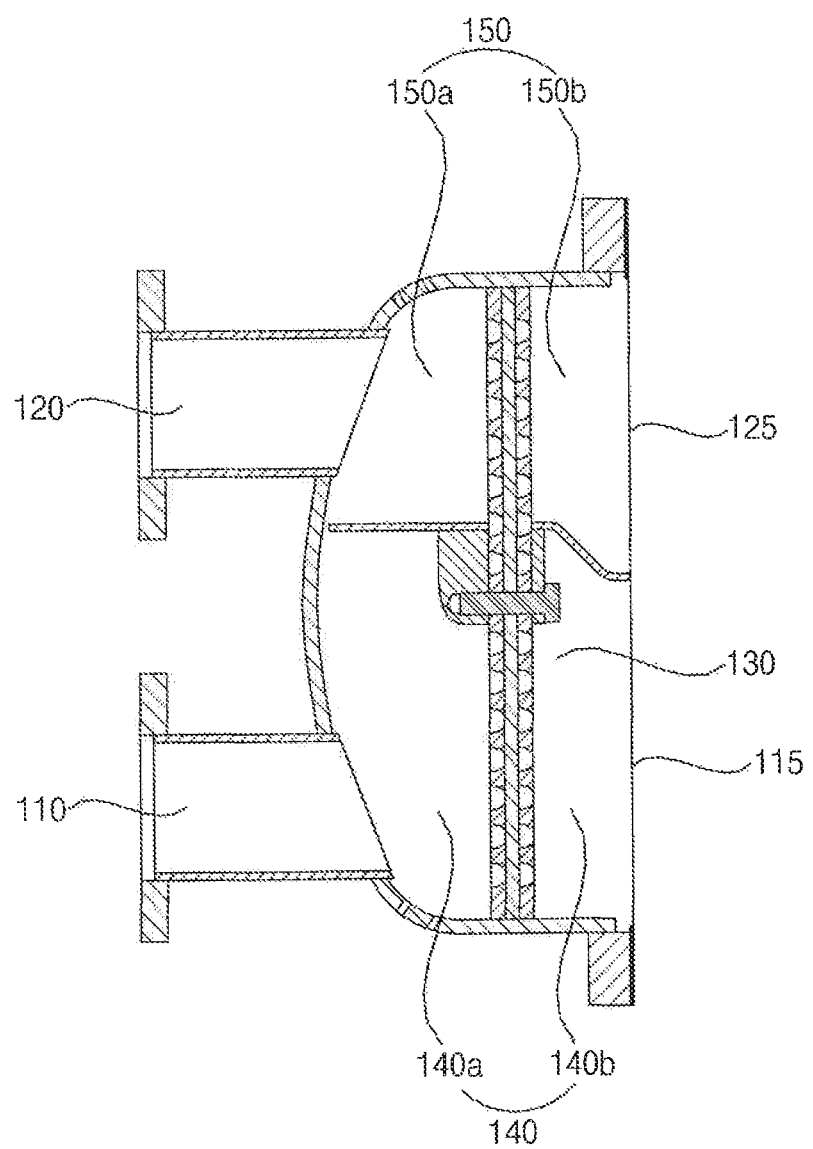

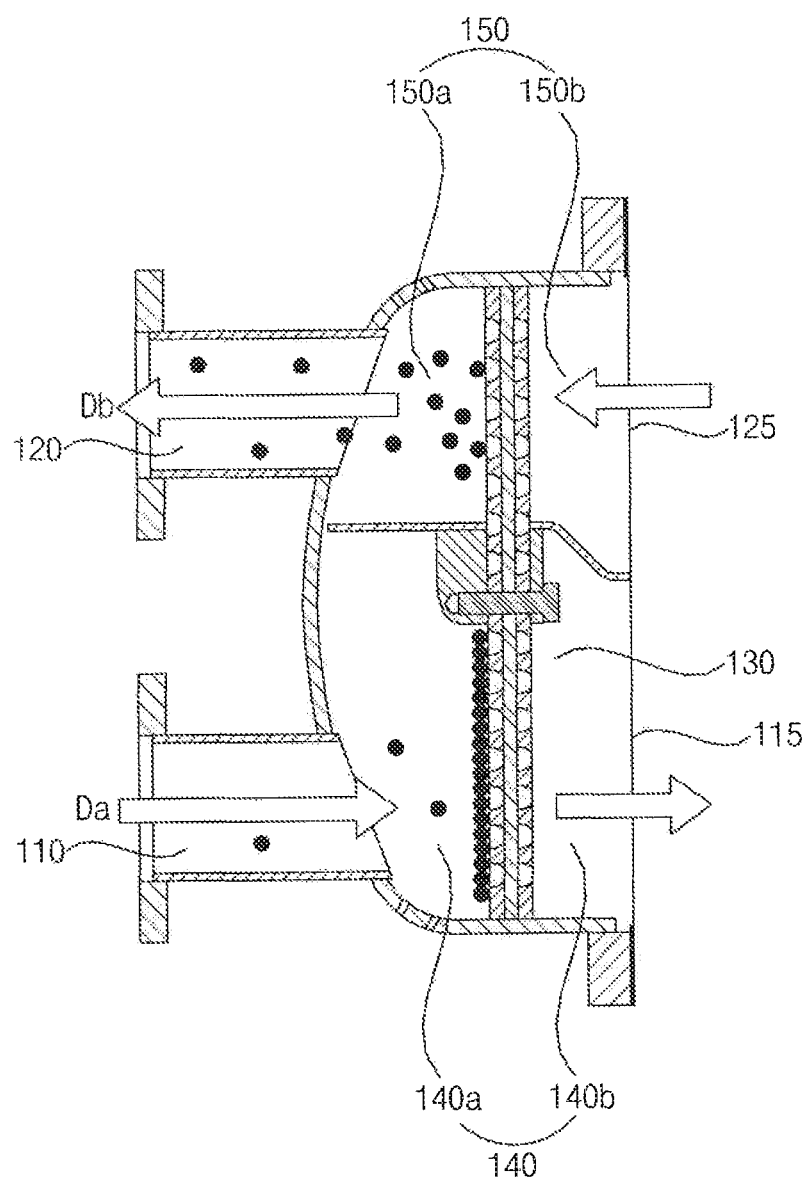
[FIG. 6A]

[FIG. 6B]
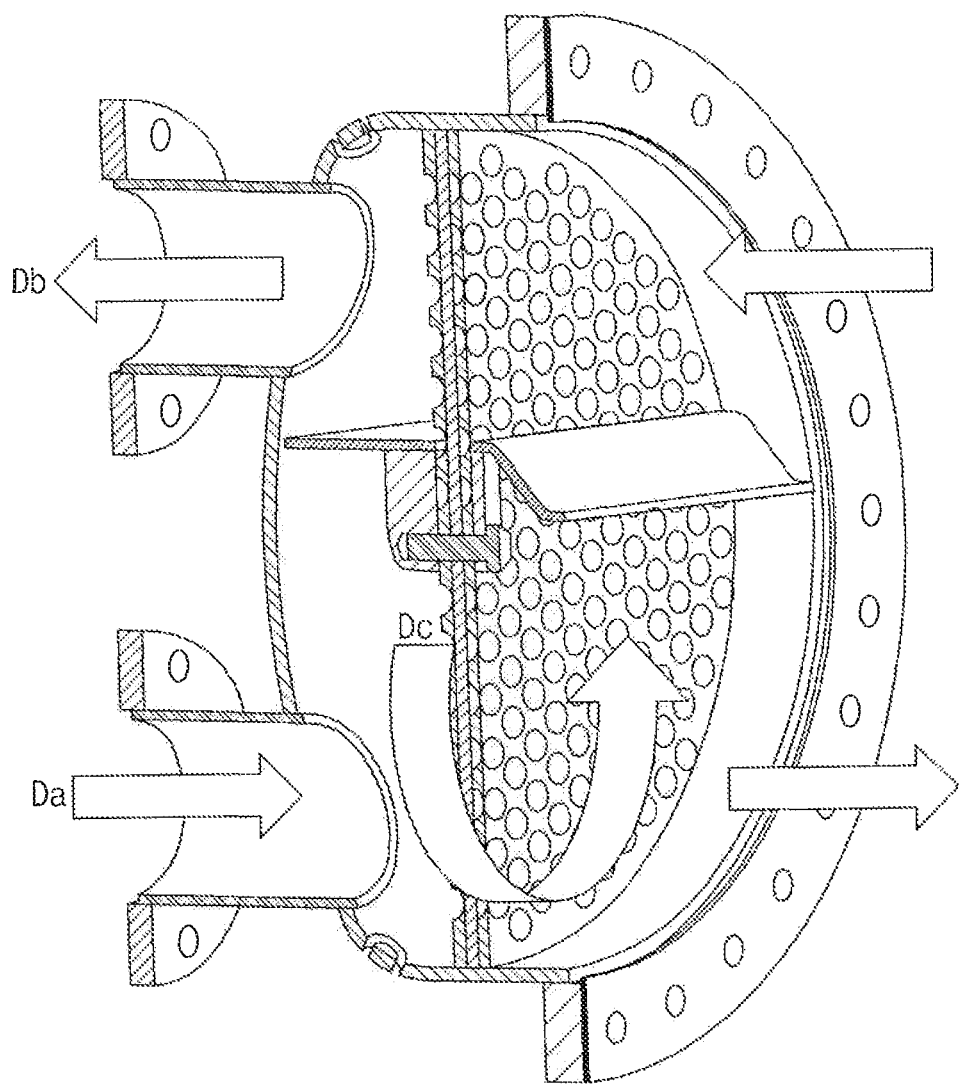

[FIG. 7A]
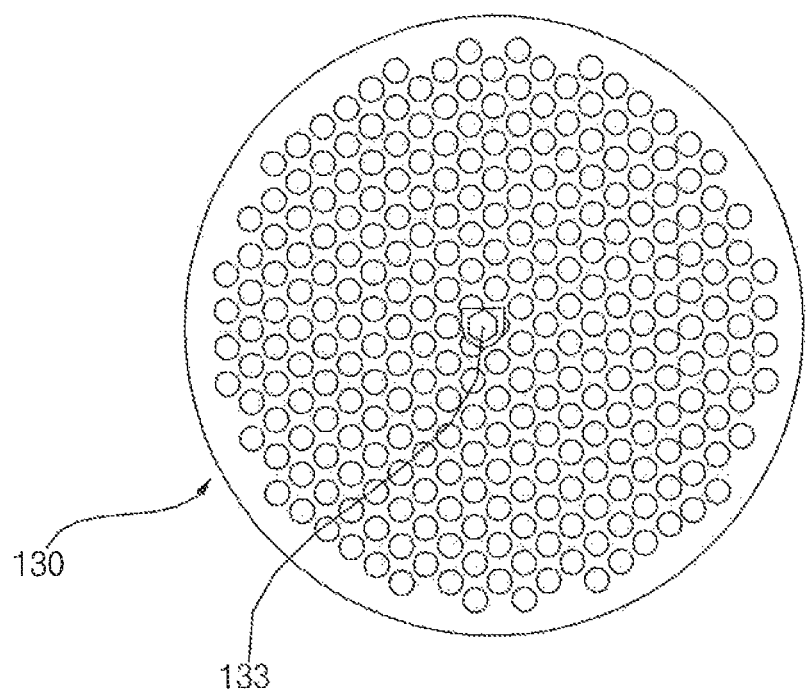

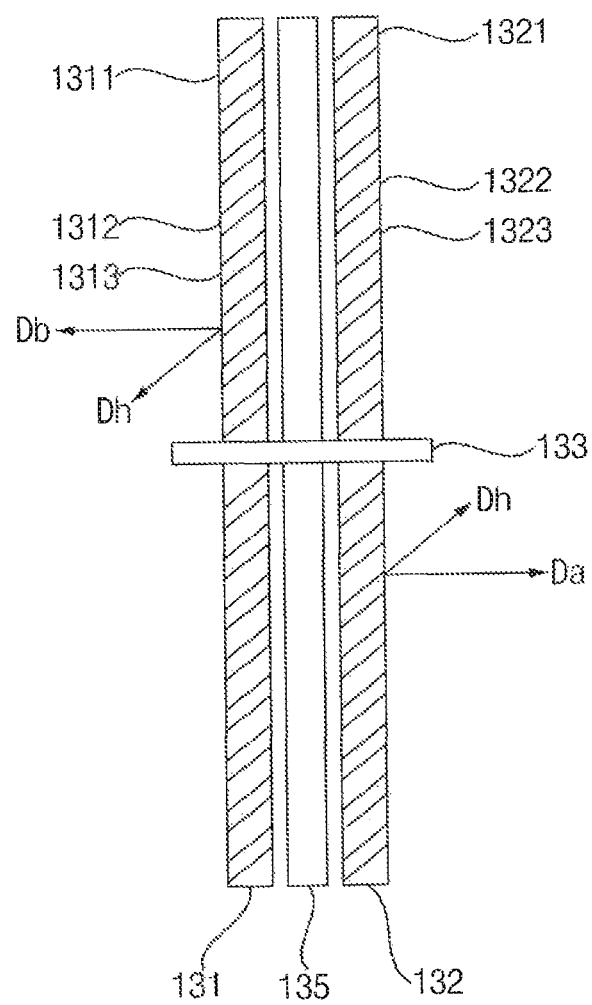
[FIG. 7B]

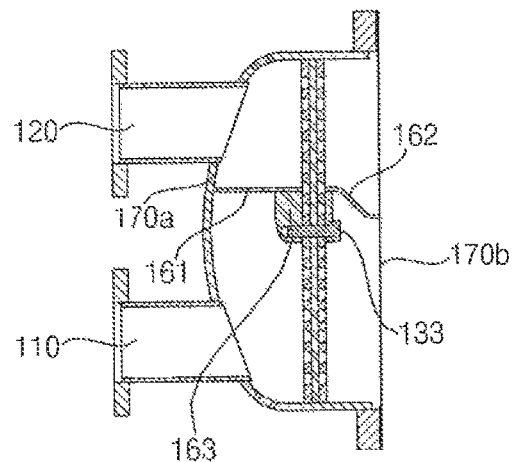
[FIG. 8A]
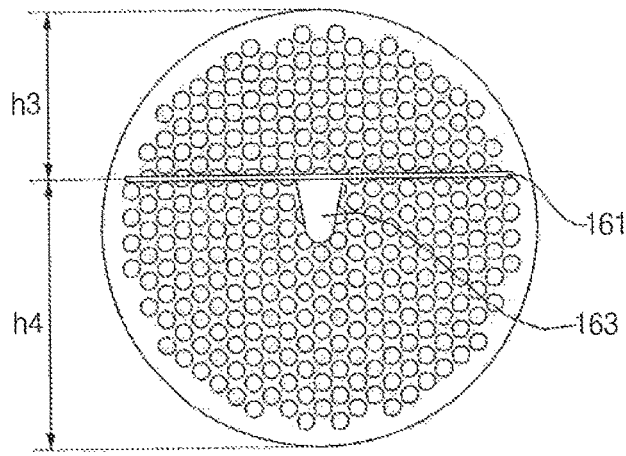
[FIG. 8B]
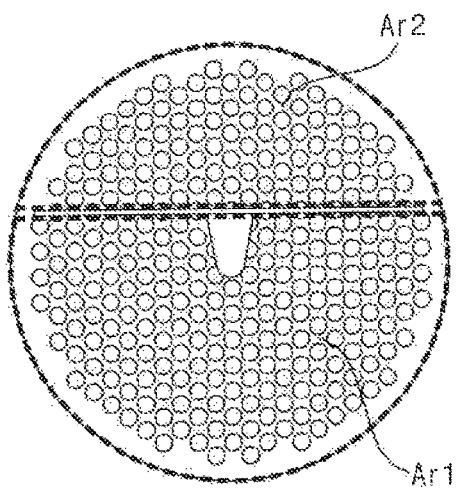
[FIG. 8C]
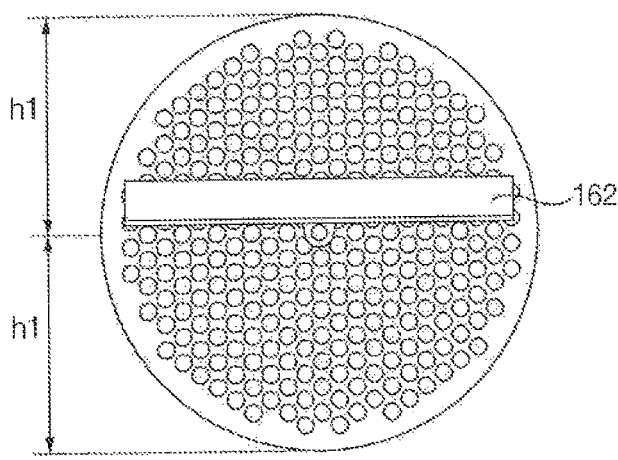
[FIG. 8D]

[FIG. 9A]
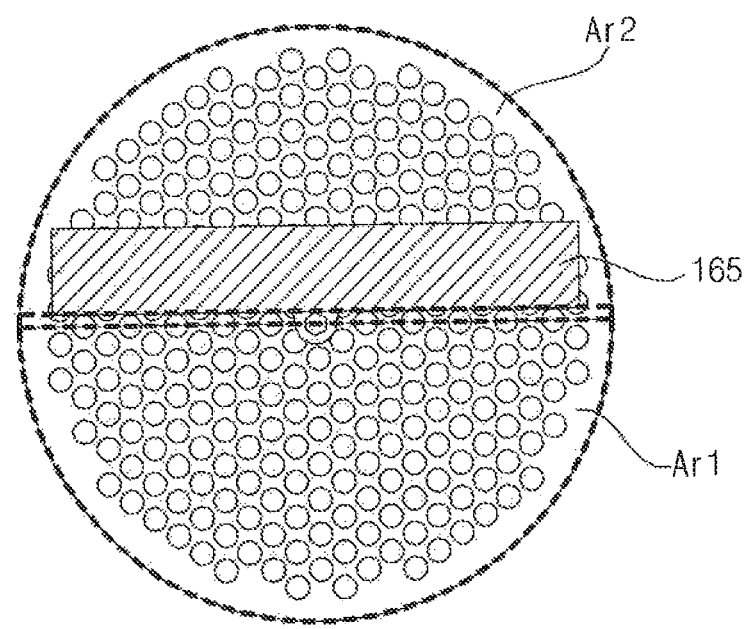

[FIG. 9B]
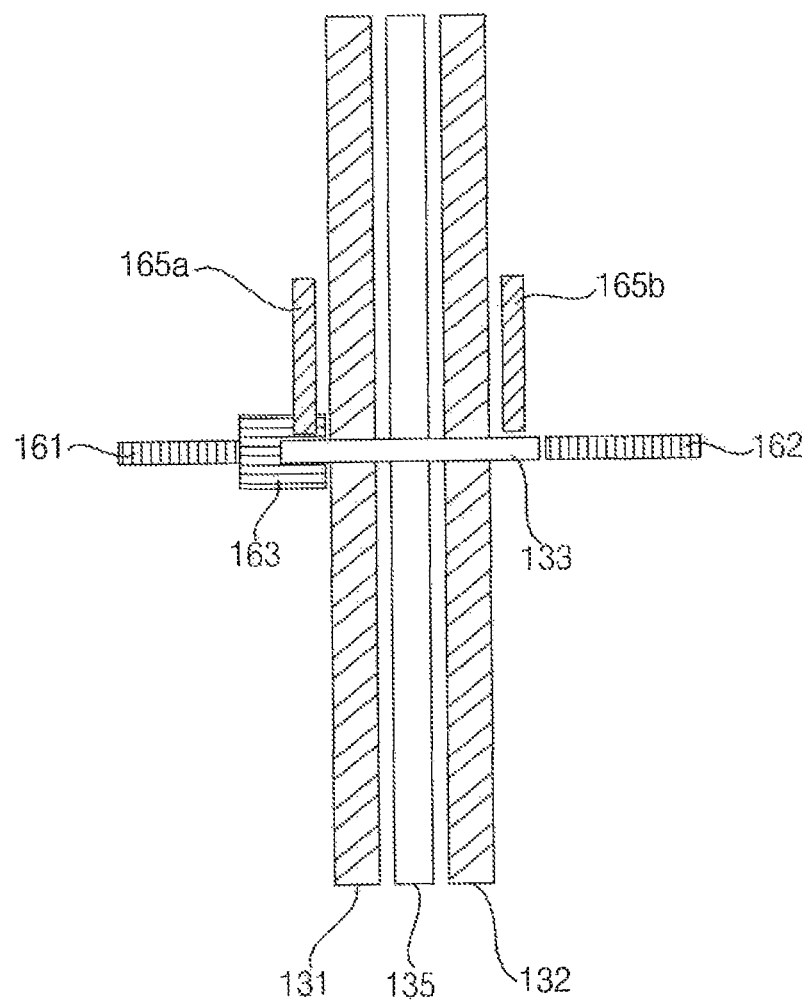

[FIG. 10A]
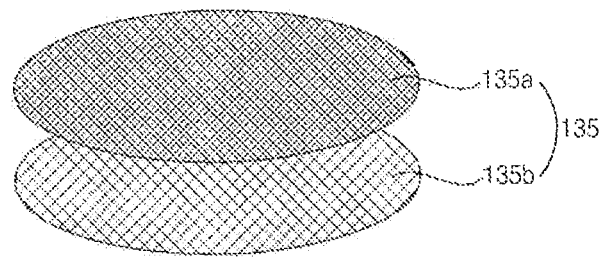
[FIG. 10B]
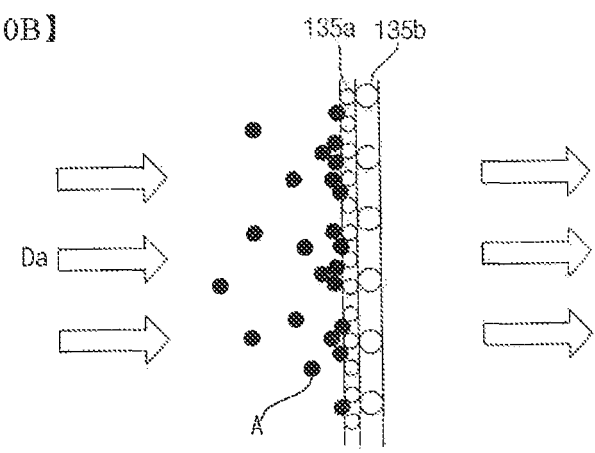
[FIG. 10C]
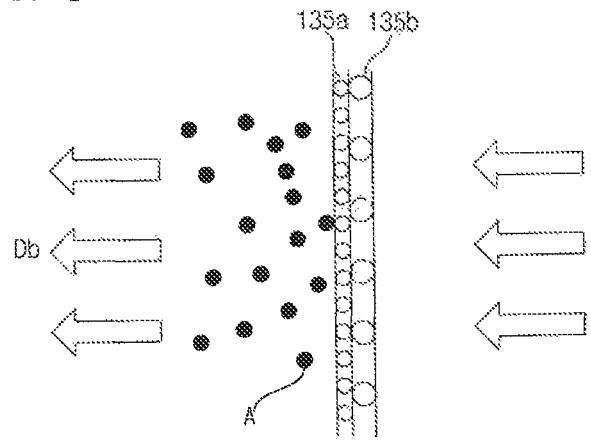

[FIG. 11A]
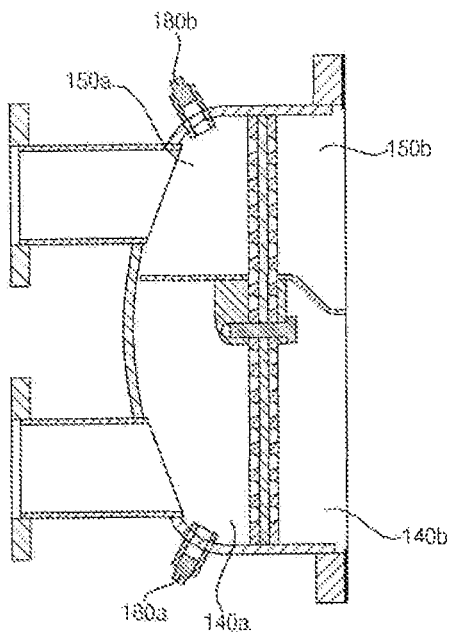
[FIG. 11B]
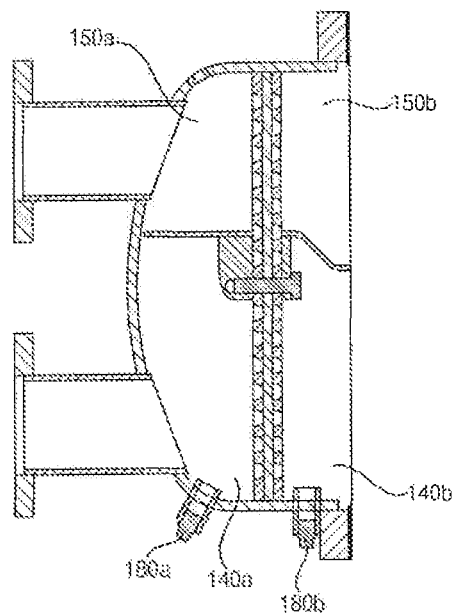

[FIG. 12]
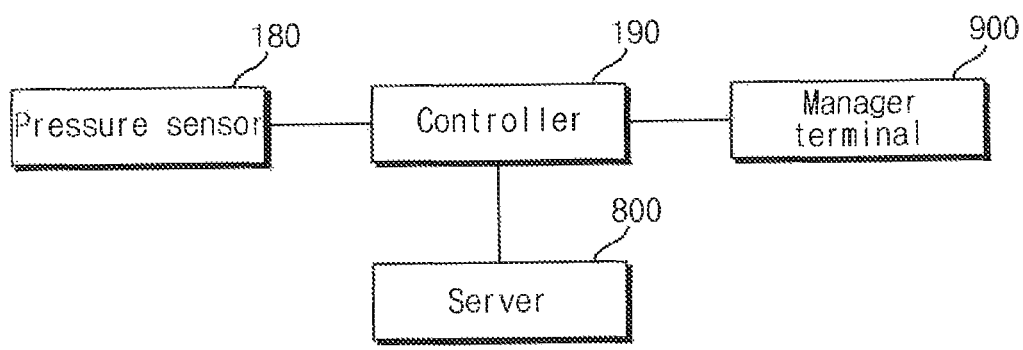
[FIG. 13]
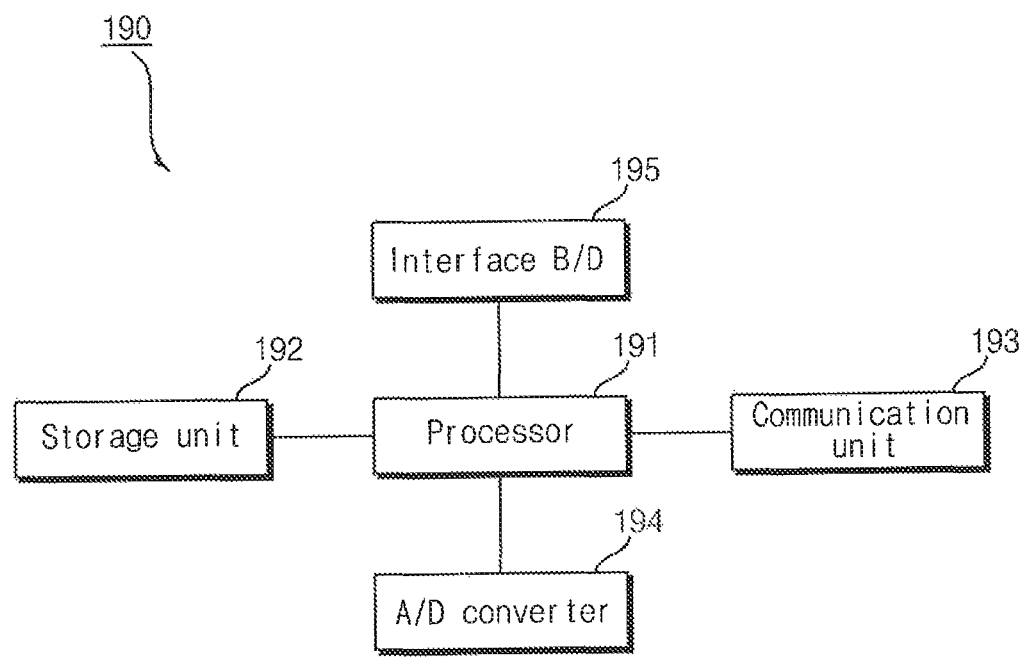

FLUID CLEANING APPARATUS

CROSS-REFERENCE TO RELATED APPLICATION(S)

This application claims priority under 35 U.S.C. § 119 to Korean Application No. 10-2020-0019267 filed on Feb. 17, 2020, whose entire disclosure is hereby incorporated by reference.

BACKGROUND OF THE INVENTION

1. Field of the Invention

The present disclosure relates to a fluid cleaning apparatus, and more particularly, to a fluid cleaning apparatus capable of preventing accumulation of foreign matter inside a heat exchanger by allowing foreign matter filtered by a filter to be discharged again to an outlet while a wheel including the filter rotates.

2. Description of the Related Art

In general, a chiller is an apparatus that performs heat exchange between cold water and cooling water by using a refrigerant, and has a feature that heat exchange is performed between a refrigerant circulating the chiller and cold water circulating between a cold water demand source and the chiller to cool the cold water. Since such a chiller is used for the purpose of large-scale air conditioning or the like, a stable operation of apparatus is required.

The structure of a conventional chiller system will be described as follows.

Referring to FIG. 1A, the main configuration of a conventional chiller system 1 includes a compressor 10, a condenser 20, an expansion mechanism 30, and an evaporator 40.

The compressor 10 is an apparatus for compressing gas such as air or refrigerant gas, and is configured to compress the refrigerant and provide to the condenser 20.

The condenser 20 is configured to cool the refrigerant by exchanging heat between high-temperature, high-pressure refrigerant discharged from the compressor 10 and passing through the condenser 20 and cooling water.

The expansion mechanism 30 is configured to send liquid refrigerant to the evaporator 40, and to change the high-pressure refrigerant into a low temperature and low-pressure refrigerant while passing through the expansion valve.

The evaporator 40 is configured to cool the cold water supplied to a load while the refrigerant evaporates.

Referring to FIG. 1B, the evaporator 40 or the condenser 20 includes a water box 41, 42 through which cold or cooling water flows into the evaporator 40 or the condenser 20 for heat exchange with the refrigerant.

The cold water or cooling water flowed into the water box 41 is heat-exchanged in the evaporator 40 or the condenser 20, and is discharged through the water box 41 again.

The quality of the cold water or the cooling water used in the chiller 1 is a very important factor in the chiller 1, because it has a direct relationship with the heat exchange performance of a heat exchanger such as the evaporator 40 or the condenser 20.

However, there are many cases where water quality management of the site where the chiller 1 is installed is not properly managed, and in some areas where the environment is poor, the performance of the chiller 1 is often significantly degraded due to water quality problems.

Since the conventional chiller 1 does not include a cleaning apparatus for water quality management of cold water or cooling water, there is a problem in that it is difficult to prevent performance degradation of the heat exchanger inside the chiller 1 in a poor water quality environment.

In addition, when a separate cleaning apparatus having a complex structure is installed inside the heat exchanger, there is a problem in that the cost of the product is increased and management is difficult, and the efficiency of the product may decrease.

SUMMARY OF THE INVENTION

The present disclosure has been made in view of the above problems, and provides a fluid cleaning apparatus capable of preventing accumulation of foreign matter inside a heat exchanger, by allowing foreign matter filtered by a filter to be discharged again to an outlet while a wheel including the filter rotates.

In addition, the present disclosure further provides a fluid cleaning apparatus capable of increasing the replacement cycle or life of the filter, by allowing foreign matter filtered by the filter to be discharged back to the outlet while the wheel including the filter rotates.

In addition, the present disclosure further provides a fluid cleaning apparatus capable of preventing a decrease in the efficiency of a heat exchanger product by allowing the wheel to rotate without additional power by the flow of the introduced fluid and the discharged fluid.

In addition, the present disclosure further provides a fluid cleaning apparatus that is easy to manage by adding only a rotating wheel and a filter having a simple structure.

In accordance with an embodiment of the present disclosure, a fluid cleaning apparatus includes: a first volume comprising a first inlet through which a first fluid is introduced and a first outlet through which the first fluid is discharged; a second volume comprising a second inlet through which a second fluid is introduced and a second outlet through which the second fluid is discharged; and a rotating wheel which is provided with a filter for filtering the first fluid, and rotatably positioned within the first volume and the second volume in a direction perpendicular to a flow direction of the first fluid or the second fluid, wherein foreign matter filtered while the first fluid passes through the filter in the first volume is discharged through the second outlet while the second fluid passes through the filter in the second volume, as the rotating wheel rotates.

In a fluid cleaning apparatus according to an embodiment of the present disclosure, the rotating wheel rotates by a flow of a fluid introduced into the first inlet and discharged through the first outlet and a flow of a fluid introduced into the second inlet and discharged through the second outlet.

In a fluid cleaning apparatus according to an embodiment of the present disclosure, the fluid rotating wheel includes a first wheel and a second wheel having a disk-shape in which a plurality of holes are formed, and the filter is located between the first wheel and the second wheel.

In a fluid cleaning apparatus according to an embodiment of the present disclosure, the plurality of holes are formed in a diagonal direction with respect to a flow direction of the first fluid or the second fluid.

In a fluid cleaning apparatus according to an embodiment of the present disclosure, the fluid cleaning apparatus further includes a cutwater plate which is formed in both sides of the rotating wheel in a direction in which the first fluid and the second fluid flow, and partitions the first volume and the second volume.

In a fluid cleaning apparatus according to an embodiment of the present disclosure, the cutwater plate includes a first partition wall partitioning a space in which the first inlet and a second outlet are located, and a second partition wall partitioning a space in which the first outlet and the second inlet are located, wherein the first partition wall is disposed closer to the second outlet than the first inlet, and the second partition wall has one end disposed in the same position as the first partition wall, and the other end that is bent so that the first outlet and the second inlet have a same area.

In a fluid cleaning apparatus according to an embodiment of the present disclosure, a first area in which the rotating wheel is located in the first volume has a larger area than a second area in which the rotating wheel is located in the second volume.

The fluid cleaning apparatus according to an embodiment of the present disclosure further includes a shielding plate configured to cover a part of the second area of the rotating wheel.

In a fluid cleaning apparatus according to an embodiment of the present disclosure, the first area in which the rotating wheel is located in the first volume and a second area in which the filter is located in the second volume have a same area.

In a fluid cleaning apparatus according to an embodiment of the present disclosure, the filter is a mesh filter made of a metal, and the metal is any one of stainless steel, aluminum, copper, tungsten, iron, and titanium.

In a fluid cleaning apparatus according to an embodiment of the present disclosure, the filter includes at least one mesh layer in which a plurality of filtering holes are formed, and a diameter of the filtering hole is different for each mesh layer.

In a fluid cleaning apparatus according to an embodiment of the present disclosure, the at least one mesh layer is stacked so as to be closer to the first inlet and the second outlet as the diameter of the filtering hole becomes smaller, and to be closer to the second inlet and the first outlet as the diameter of the filtering hole becomes larger.

In a fluid cleaning apparatus according to an embodiment of the present disclosure, the first outlet is connected to a cold water inflow tube or cooling water inflow tube of a heat exchanger, and the second inlet is connected to a cold water discharge tube or cooling water discharge tube of the heat exchanger.

The fluid cleaning apparatus according to an embodiment of the present disclosure further includes a pressure sensor installed in both sides of the rotating wheel, respectively, to measure a pressure of the first fluid or the second fluid.

The fluid cleaning apparatus according to an embodiment of the present disclosure further includes a controller for calculating a pressure difference from a pressure value of both sides of the rotating wheel measured by the pressure sensor, wherein the controller generates an alarm signal when the pressure difference is greater than or equal to a preset value, and transmits to a control server or a manager terminal.

BRIEF DESCRIPTION OF THE DRAWINGS

The above and other objects, features and advantages of the present disclosure will be more apparent from the following detailed description in conjunction with the accompanying drawings, in which:

FIGS. 1A and 1B are diagrams illustrating a structure of a conventional chiller and a water box included therein;

FIGS. 2 and 3 are diagrams illustrating a chiller including a fluid cleaning apparatus according to an embodiment of the present disclosure;

FIGS. 4A to 4D are diagrams illustrating a fluid cleaning apparatus according to an embodiment of the present disclosure;

FIG. 5 is a cross-sectional view of the fluid cleaning apparatus of FIG. 4;

FIGS. 6A and 6B are diagrams for explaining fluid flow and rotation of wheel in the fluid cleaning apparatus of FIG. 4;

FIGS. 7A and 7B are diagrams illustrating a rotating wheel included in the fluid cleaning apparatus of FIG. 4;

FIGS. 8A to 8D are diagrams illustrating a cutwater plate included in the fluid cleaning apparatus of FIG. 4;

FIGS. 9A to 9B are diagrams illustrating a shielding plate included in a fluid cleaning apparatus according to another embodiment of the present disclosure;

FIGS. 10A to 10C are diagrams for explaining the operation of a filter included in a fluid cleaning apparatus of the present disclosure;

FIGS. 11A and 11B are diagrams illustrating various examples of a pressure sensor included in a fluid cleaning apparatus of the present disclosure;

FIG. 12 is a diagram illustrating a controller included in a fluid cleaning apparatus of the present disclosure; and FIG. 13 is a diagram illustrating a detailed configuration of the controller of FIG. 12.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated. In general, suffixes such as "module" and "unit" may be used to refer to elements or components. Use of such suffixes herein is merely intended to facilitate description of the specification, and the suffixes do not have any special meaning or function. In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings. It will be understood that although the terms first, second, etc. may be used herein to describe various elements, these elements should not be limited by these terms. These terms are only used to distinguish one element from another. It will be understood that when an element is referred to as being "connected with" another element, there may be intervening elements present. In contrast, it will be understood that when an element is referred to as being "directly connected with" another element, there are no intervening elements present. A singular representation may include a plural representation unless context clearly indicates otherwise. Terms such as "includes" or "has" used herein should be considered as indicating the presence of several components, functions or steps, disclosed in the specification, and it is also understood that more or fewer components, functions, or steps may likewise be utilized.

FIGS. 2 and 3 are diagrams illustrating a chiller 2 including a fluid cleaning apparatus 100 according to an embodiment of the present disclosure.

Meanwhile, the fluid cleaning apparatus 100 according to an embodiment of the present disclosure not only functions as a part of a chiller system, but may also be included in an air conditioner, and may be included in any apparatus that circulates fluid.

Referring to FIG. 2, the chiller 2 including the fluid cleaning apparatus 100 according to an embodiment of the present disclosure may include a compressor 700 configured to compress a refrigerant, a condenser 200 for condensing the refrigerant by a heat-exchange between the refrigerant compressed in the compressor 700 and the cooling water, an expander 300 for expanding the refrigerant condensed in the condenser 200, and an evaporator 400 configured to cool the cold water together with the evaporation of the refrigerant by a heat-exchange between the refrigerant expanded in the expander 300 and the cold water.

Meanwhile, the chiller 2 may further include a cooling water unit 600 configured to cool the cooling water heat-exchanged with the refrigerant in the condenser 200, and an air conditioning unit 500 that cools the air of air conditioning space by heat-exchanging between the cold water cooled in the evaporator 400 and the air of air conditioning space.

The compressor 700 may include at least one impeller 720 that sucks a refrigerant in an axial direction and compresses the sucked refrigerant in a centrifugal direction, and a motor 730 that is accommodated in a motor housing and rotates.

The impeller 720 is rotated by a rotation shaft 711, and compresses the refrigerant introduced in the axial direction by rotation in the centrifugal direction, so that the refrigerant acquires high pressure.

The motor 730 may include a stator 734 and a rotor 733, and may rotate the rotation shaft 711. The rotation shaft 711 may be connected to the impeller 720 and the motor 730.

The condenser 200 may provide a place for a heat-exchange between the high-pressure refrigerant compressed by the compressor 700 and the cooling water introduced from the cooling water unit 600. The compressed high-pressure refrigerant is condensed through heat exchange with the cooling water.

The condenser 200 may be configured of a shell-tube type heat exchanger. Specifically, the high-pressure refrigerant compressed by the compressor 700 flows into a condensation space 230 corresponding to the internal space of the condenser 200 through a condenser connection flow path 160. In addition, the condensation space 230 may include a cooling water flow path 210 through which cooling water introduced from the cooling water unit 600 flows.

The cooling water flow path 210 may include a cooling water inflow flow path 211 through which cooling water is introduced from the cooling water unit 600, and a cooling water discharge flow path 212 through which cooling water is discharged to the cooling water unit 600. The cooling water introduced into the cooling water inflow flow path 211 exchanges heat with the refrigerant in the condensation space 230, and then passes through a cooling water connection flow path 240 provided in one end of the condenser 200 or provided outside the cooling water discharge flow path 212.

The cooling water unit 600 and the condenser 200 may be connected via a cooling water tube 220. The cooling water tube 220 may be a flow path through which cooling water flows between the cooling water unit 600 and the condenser 200. In addition, the cooling water tube 220 may be made of a material such as rubber so that the cooling water does not leak to the outside.

The cooling water tube 220 may be composed of a cooling water inflow tube 221 connected to the cooling water inflow flow path 211, and a cooling water discharge tube 222 connected to the cooling water discharge flow path 212.

In the overall flow of the cooling water, the cooling water that has completed heat exchange with air or liquid in the cooling water unit 600 flows into the condenser 200 through the cooling water inflow tube 221. While passing through the cooling water inflow flow path 211, the cooling water connection flow path 240, and the cooling water discharge flow path 212 provided in the condenser 200 sequentially, the cooling water introduced into the condenser 200 performs heat exchange with the refrigerant introduced into the condenser 200, and then introduced again into the cooling water unit 600 through the cooling water discharge tube 222.

Meanwhile, the cooling water unit 600 may air-cool the cooling water that absorbed heat of the refrigerant through heat exchange in the condenser 200. The cooling water unit 600 may include a main body 630, a cooling water inflow pipe 610 which is an inlet through which the cooling water that absorbed heat is introduced through the cooling water discharge tube 222, and a cooling water discharge pipe 620 which is an outlet through which the cooling water is discharged after being cooled inside the cooling water unit 600.

The cooling water unit 600 may use air to cool the cooling water introduced into the main body 630. Specifically, the main body 630 may include a fan for generating air flow, and may include an air outlet 631 through which air is discharged and an air inlet 632 corresponding to an inlet through which air is introduced into the main body 630.

The air discharged from the air outlet 631 after completing heat exchange may be used for heating. The refrigerant that completed heat-exchange is condensed in the condenser 200 and collected in a lower portion the condensation space 230. The collected refrigerant flows into the expander 300 after flowing into a refrigerant box 250 provided in the condensation space 230.

The refrigerant box 250 may include a refrigerant inlet 251. The refrigerant flowing into the refrigerant inlet 251 is discharged through an expansion mechanism connection flow path 260. The expansion mechanism connection flow path 260 may include an expansion mechanism connection flow path inlet 261, and the expansion mechanism connection flow path inlet 261 may be located in the lower portion of the refrigerant box 250.

The evaporator 400 may include an evaporation space 430 in which heat exchange occurs between the refrigerant expanded in the expander 300 and the cold water. The refrigerant passed through the expander 300 in the expansion mechanism connection flow path 260 flows through an evaporator connection flow path 360 to a refrigerant spray apparatus 450 provided in the evaporator 400, and spreads evenly into the evaporator 400 through a refrigerant spray hole 451 provided in the refrigerant spray apparatus 450.

In addition, a cold water flow path 410 including a cold water inflow flow path 411 through which cold water flows into the evaporator 400 and a cold water discharge flow path 412 through which cold water is discharged to the outside of the evaporator 400 may be provided inside the evaporator 400.

Cold water is introduced or discharged through a cold water tube 420 communicating with the air conditioning unit 500 provided outside the evaporator 400. The cold water tube 420 may include a cold water inflow tube 421 that is a passage for cold water inside the air conditioning unit 500 to the evaporator 400, and a cold water discharge tube 422 that is a passage for cold water that completed heat-exchange in the evaporator 400 to the air conditioning unit 500. That is, the cold water inflow tube 421 communicates with the cold water inflow flow path 411 and the cold water discharge tube 422 communicates with the cold water outlet flow path 412.

In the flow of cold water, the cold water passes through a cold water connection flow path 440 provided the inner one end of the evaporator 400 or provided outside the evaporator 400 via the air conditioning unit 500, the cold water inflow tube 421, and the cold water inflow flow path 411, and then is introduced into the air conditioning unit 500 again via the cold water discharge flow path 412 and the cold water discharge tube 422.

The air conditioning unit 500 may exchange heat between cold water cooled in the evaporator 400 and air in the air conditioning space. The cold water cooled in the evaporator 400 absorbs heat of air in the air conditioning unit 500 to enable indoor cooling. The air conditioning unit 500 may include a cold water discharge pipe 520 communicating with the cold water inflow tube 421 and a cold water inflow pipe 510 communicating with the cold water discharge tube 422. The refrigerant that completed heat exchange in the evaporator 400 flows again into the compressor 700 through a compressor connection flow path 460.

In the flow of the refrigerant, the refrigerant flowing into the compressor 700 through the compressor connection flow path 460 is compressed in the circumferential direction due to the action of the impeller 720 and then discharged to a condenser connection flow path 760. The compressor connection flow path 460 may be connected to the compressor 700 so that the refrigerant is introduced in a direction perpendicular to the rotation direction of the impeller 720.

The fluid cleaning apparatus 100 according to an embodiment of the present disclosure may be included in at least one or more positions among between the cooling water tube 220 and the cooling water flow path 210 of the condenser 200 or between the cold water tube 420 and the cold water flow path 410 of the evaporator 400.

Referring to FIGS. 2 and 3, the fluid cleaning apparatus 100 according to an embodiment of the present disclosure may include a first inlet 110 through which a first fluid is introduced, a first outlet 115 through which the first fluid is discharged, a second inlet 125 through which a second fluid is introduced, and a second outlet 120 through which the second fluid is discharged.

Specifically, the first inlet 110 may be connected to the cooling water inflow tube 221 of the condenser 200, the second outlet 120 may be connected to the cooling water discharge tube 222 of the condenser 200, the first outlet 115 may be connected to the cooling water inflow flow path 211 of the condenser 200, and the second inlet 125 may be connected to the cooling water discharge flow path 212 of the condenser 200.

Meanwhile, the first inlet 110 may be connected to the cold water inflow tube 421 of the evaporator 400, the second outlet 120 may be connected to the cooling water discharge tube 422 of the evaporator 400, the first outlet 115 may be connected to the cold water inflow flow path 411 of the evaporator 400, and the second inlet 125 may be connected to the cold water discharge flow path 412 of the evaporator 400.

Accordingly, the fluid cleaning apparatus 100 is installed in the cooling water inflow path or cold water inflow path of a heat exchanger such as the condenser 200 or the evaporator 400 to filter foreign substances contained in the cooling water or the cold water flowing into the heat exchanger.

FIG. 4 is a diagram illustrating a fluid cleaning apparatus 100 according to an embodiment of the present disclosure.

Referring to FIG. 4, the fluid cleaning apparatus 100 may include a housing 170, a first inlet 110 and a second outlet 120 formed in one side surface of the housing, and a rotating wheel 130 positioned to be rotatable in the housing 170.

The first inlet 110 and the second outlet 120 may be formed in one side surface of the housing 170 to face the same direction so as to facilitate connection with the cooling water or cold water inflow/discharge tube. A plurality of coupling holes 111 and 121 for coupling to the tube may be formed in an edge of one end of the first inlet 110 and the second outlet 120 connected to the cooling water or cold water inflow/discharge tube.

The other side surface of the housing 170 may be open to be connected to the cooling water or cold water inflow/discharge flow path, and a plurality of coupling holes 171 for coupling with the heat exchanger may be formed in the edge of the other side surface of the housing 170.

The interior of the housing 170 may have a cross section having a circular shape so that the space is separated by a circular rotating wheel and the rotating wheel rotates.

FIG. 5 is a cross-sectional view of the fluid cleaning apparatus 100 of FIG. 4.

Referring to FIG. 5, the interior of the housing 170 of the fluid cleaning apparatus 100 may be formed of a first volume 140 and a second volume 150.

The first volume 140 includes a first inlet 110 through which a first fluid is introduced and a first outlet 115 through which the first fluid is discharged, and may be divided into a first A volume 140a in which the first inlet 110 is positioned and a first B volume 140b in which the first outlet 115 is positioned.

The second volume 150 includes a second inlet 125 through which a second fluid is introduced and a second outlet 120 through which the second fluid is discharged, and may be divided into a second A volume 150a in which the second outlet 120 is positioned and a second B volume 150b in which the second inlet 125 is positioned.

The rotating wheel 130 includes a filter 135 for filtering the first fluid, and may be positioned to be rotatable in a direction perpendicular to a direction in which the first fluid or the second fluid flows in the first volume 140 and the second volume 150.

By the rotating wheel 130, the first A volume 140a and the first B volume 140b are divided, and the second A volume 150a and the second B volume 150b are divided.

FIGS. 6A and 6B are diagrams for explaining fluid flow and rotation of wheel in the fluid cleaning apparatus of FIG. 4.

Referring to FIG. 6A, the first fluid may flow into the first inlet 110, pass through a cross section of the rotating wheel 130 in the first volume 140, and be discharged through the first outlet 115.

The rotating wheel 130 is provided with a plurality of holes to allow fluid to pass through. Accordingly, the first fluid passes through a cross section of the rotating wheel 130 through a plurality of holes. Foreign matter contained in the first fluid is filtered by the filter 135 included in the rotating wheel 130 while the first fluid passes through the rotating wheel 130. The filtered foreign matter may be accumulated in the surface of the rotating wheel 130 in the first A volume 140a.

The rotating wheel 130 may rotate in a direction perpendicular to a direction Da in which the first fluid flows. As the rotating wheel 130 rotates, foreign matter accumulated on the surface of the rotating wheel 130 rotates to move into the second A volume 150a.

Meanwhile, the second fluid may flow into the second inlet 125, pass through a cross section of the rotating wheel 130 in the second volume 150, and be discharged through the second outlet 120.

The second fluid passes through a cross section of the rotating wheel 130 through a plurality of holes. The second fluid is a fluid that is the first fluid, introduced into the heat exchanger, which is heat-exchanged while passing through the cooling water flow path 210 or the cold water flow path 410 and is discharged to the outside of the heat exchanger.

Foreign matter accumulated on the surface of the rotating wheel 130 may be separated from the surface of the rotating wheel 130 due to the flow of the second fluid while the second fluid passes through the rotating wheel 130. The separated foreign matter may move in the direction Db in which the second fluid flows and may be discharged through the second outlet 120 together with the second fluid.

Thus, foreign matter contained in the first fluid is accumulates in the first A volume 140a, moves into the second A volume 150a, and then is discharged through the second outlet 120.

Accordingly, the foreign matter contained in the first fluid does not move into the heat exchanger and is discharged to the outside of the heat exchanger, so that the foreign matter is not accumulated inside the heat exchanger.

Meanwhile, referring to FIG. 6B, the rotating wheel 130 may rotate by the flow of the first fluid which is introduced through the first inlet 110 and discharged through the first outlet 115, and the flow of the second fluid which is introduced through the second inlet 125 and discharged through the second outlet 120. The rotating wheel 130 may rotate in a direction Dc perpendicular to a direction Da and Db in which the first fluid or the second fluid flows.

Since the rotating wheel 130 rotates by the flow of the first fluid and the second fluid, the fluid cleaning apparatus 100 does not include a separate power apparatus so as to rotate the rotating wheel 130. The rotation of the rotating wheel 130 will be described in detail in FIGS. 7A and 7B below.

FIGS. 7A and 7B are diagrams illustrating a rotating wheel 130 included in the fluid cleaning apparatus of FIG. 4.

Referring to FIG. 7A, the rotating wheel 130 may have a disk shape in which a plurality of holes 1311, 1312, 1313, 1321, 1322, and 1323 are formed. The diameter of the rotating wheel 130 may be the same as the diameter of the circular cross section of the housing 170.

The rotating wheel 130 may rotate about a rotation shaft 133, and the rotation shaft 133 is connected to the housing 170. The rotation shaft 133 of the rotating wheel 130 extends parallel to the first direction. The first direction is a left-right direction in FIG. 7B. The rotating wheel 130 covers the first volume and the second volume in the first direction. The rotating wheel 130 may completely overlap the first volume and the second volume in the first direction.

Meanwhile, referring to FIG. 7B, the rotating wheel 130 may include a first wheel 131 and a second wheel 132, and a filter 135 may be located between the first wheel 131 and the second wheel 132.

The filter 135 is supported by the first wheel 131 and the second wheel 132 to stably filter foreign matter in the fluid.

Meanwhile, a plurality of holes 1311, 1312, 1313, 1321, 1322, and 1323 formed in the first wheel 131 and the second wheel 132 may be formed in a diagonal direction Dh with respect to the flow direction Da, Db of the first fluid or the second fluid.

A plurality of holes 1311, 1312, 1313, 1321, 1322, and 1323 may extend in a direction between a first direction and a second direction perpendicular to the first direction. It is preferable that the angle formed by the plurality of holes 1311, 1312, 1313, 1321, 1322, and 1323 with respect to the first direction is between 20 degrees and 45 degrees. This is because when the angle formed by the plurality of holes 1311, 1312, 1313, 1321, 1322, and 1323 with respect to the first direction is less than 20 degrees, the driving force of the wheel cannot be obtained due to the flow of fluid, and when the angle formed by the plurality of holes 1311, 1312, 1313, 1321, 1322, and 1323 with respect to the first direction is greater than 45 degrees, the flow velocity of the fluid decreases as the resistance is severe.

When the first fluid and the second fluid pass through the plurality of holes 1311, 1312, 1313, 1321, 1322, and 1323 in the diagonal direction, force is applied to the side surface inside the hole by the first fluid and the second fluid, and the rotating wheel 130 may rotate by a corresponding force.

The hole 1311, 1312, 1313 of the first wheel 131 and the hole 1321, 1322, 1323 of the second wheel 132 are formed in the same direction.

Accordingly, the wheel rotates without additional power, so that the efficiency of the heat exchanger can be prevented from deteriorating. In addition, since the fluid cleaning apparatus 100 has a simple structure including a rotating wheel and a filter without a separate power source, management of the apparatus is facilitated.

FIG. 8 is a diagram illustrating a cutwater plate 160 included in the fluid cleaning apparatus 100 of FIG. 4.

Referring to FIG. 8, the fluid cleaning apparatus 100 may include a cutwater plate 160.

The cutwater plate 160 may be formed in both sides of the rotating wheel 130 in a direction Da, Db in which the first fluid and the second fluid flow, and formed to partition the first volume 140 and the second volume 150.

The cutwater plate 160 is formed in a direction perpendicular to the circumferential direction of the rotating wheel 130. The inner space of the housing 170 may be divided into a first A volume 140a, a first B volume 140b, a second A volume 150a, and a second B volume 150b by the cutwater plate 160 and the rotating wheel 130.

Meanwhile, the cutwater plate 160 includes a first partition wall 161 partitioning a space in which the first inlet 110 and the second outlet 120 are located into the first A volume 140a and the second A volume 150a, and a second partition wall 162 partitioning a space in which the first outlet 115 and the second inlet 125 are located into the first B volume 140b and the second B volume 150b.

Referring to FIG. 8A, the first partition wall 161 has one end adjacent to the cross section of the rotating wheel 130, and the other end coupled with a surface 170a in which the first inlet 110 and the second outlet 120 of the housing 170 are formed.

Referring to FIGS. 8B and 8C, the first partition wall 161 may be located in one side around the rotation shaft 133. For example, the first partition wall 161 may be located closer to the second outlet 120 than the first inlet 110. Accordingly, a cross section of the rotating wheel 130 is divided into a first area Ar 1 having a height of h4 and a second area Ar 2 having a height of h3, and the area of the first area Ar 1 may be larger than the area of the second area Ar 2.

The first area Ar 1 is an area through which the first fluid passes through the rotating wheel 130, and the second area Ar 2 is an area through which the second fluid passes through the rotating wheel 130. Since the area of the first area Ar 1 is larger than the area of the second area Ar 2, the flow rate of the first fluid flowing into the fluid cleaning apparatus 100 becomes slower than the flow rate of the second fluid discharged from the fluid cleaning apparatus 100.

Accordingly, the fluid cleaning apparatus 100 may reduce the flow rate of the incoming first fluid to effectively filter foreign matter, and increase the flow rate of the discharged second fluid to effectively discharge the filtered foreign matter.

Meanwhile, a shaft connection part 163 is formed in the first partition wall 161. A hole is formed in the shaft connection part 163 so that the rotation shaft 133 of the rotating wheel 130 can be coupled and rotated.

Referring to FIGS. 8A and 8D, the second partition wall 162 has one end adjacent to the cross-section of the rotating wheel 130, and the other end adjacent to the cross-section 170b in which the first outlet 115 and the second inlet 125 of the housing 170 are formed.

One end of the second partition wall 162 may be located at the same height as one end of the first partition wall 161 adjacent to the cross section of the rotating wheel 130. The other end of the second partition wall 162 may be located at the same height as the position of the rotation shaft 133. In this case, the second partition wall 162 has a shape whose central portion is bent. The first outlet 115 and the second inlet 125 are separated by the other end of the second partition wall 162, and the first outlet 115 and the second inlet 125 have the same cross-sectional area.

FIGS. 9A to 9B are diagrams illustrating a shielding plate 165 included in a fluid cleaning apparatus 100 according to another embodiment of the present disclosure.

The fluid cleaning apparatus 100 according to another embodiment of the present disclosure may include a shielding plate 165. The shielding plate 165 may be formed to cover a part of the second area Ar 2 of the rotating wheel 130.

Referring to the drawings, the shielding plate 165 may be formed to cover a part of a cross section of at least one of the first wheel 131 and the second wheel 132. For example, the shielding plate 165 may include at least one of a first shielding plate 165a covering a part of the area of the first wheel 131 that is located in the second A volume 140a, and a second shielding plate 165a covering a part of the area of the second wheel 132 that is located in the second B volume 140b.

The first partition wall 161 and the second partition wall 162 may be formed at the same height as the position of the rotation shaft 133. Accordingly, the first area Ar 1 in which the rotating wheel 130 is located in the first volume 140 and the second area Ar 2 in which the rotating wheel 130 is located in the second volume 150 have the same area.

Since the second area Ar 2 is partially covered by the shielding plate 165, the area through which the second fluid passes through the rotating wheel 130 is the area excluding the area covered by the shielding plate 165 in the second area Ar 2. Since the first fluid passes through the rotating wheel 130 in the first area Ar 1, the first fluid may pass through the rotating wheel 130 through a wider area than the second fluid.

In this case, the flow rate of the first fluid flowing into the fluid cleaning apparatus 100 becomes slower than the flow rate of the second fluid discharged from the fluid cleaning apparatus 100.

Accordingly, the fluid cleaning apparatus 100 may reduce the flow rate of the incoming first fluid to effectively filter foreign matter, and increase the flow rate of the discharged second fluid to effectively discharge the filtered foreign matter.

Meanwhile, a shaft connection part 163 is formed in the first partition wall 161. A hole is formed in the shaft connection part 163 so that the rotation shaft 133 of the rotating wheel 130 can be coupled and rotated. When the shielding plate 165 is formed to cover a part of the first wheel 131, the shielding plate 165a may be integrally formed with the shaft connection part 163.

Meanwhile, when the shielding plate 165 is formed to cover a part of the second wheel 132, the shielding plate 165b may be integrally formed with the second partition wall 162.

FIG. 10 is a diagram for explaining the operation of a filter 135 included in a fluid cleaning apparatus 100 of the present disclosure.

Referring to FIG. 10A, the filter 135 may include at least one mesh layer having a plurality of filtering holes formed thereon. The diameter of the filtering holes formed in the at least one mesh layer 135a, 135b may be different from each other for each mesh layer 135a, 135b.

Referring to FIG. 10B, the at least one mesh layer 135a, 135b may be stacked to be located closer to the first inlet 110 and the second outlet 120 as the diameter of the filtering hole decreases, and located closer to the second inlet 125 and the first outlet 115 as the diameter of the filtering hole increases.

When the first fluid flows into the first A volume 140a, foreign matter A included in the first fluid may be filtered by the first mesh layer 135a having the smallest diameter of the filtering hole. The second mesh layer 135b including filtering holes having a larger diameter than the first mesh layer 135a may serve to stably support the first mesh layer 135a.

Referring to FIG. 10C, when the rotating wheel 130 rotates so that the area where the foreign matter A is fixed to the surface moves into the second A volume 150b, the foreign matter A may be discharged away from the surface by the second fluid passing through the rotating wheel 130. Since the first mesh layer 135a to which the foreign material A is fixed is located closest to the second outlet 120 than other mesh layers, the foreign material A fixed to the surface of the first mesh layer 135a may be easily separated from the surface and discharged through the second outlet 120.

Meanwhile, the filter 135 is a metal mesh filter, and the metal may be any one of stainless steel, aluminum, copper, tungsten, iron, and titanium. The fluid flowing into and discharged from the heat exchanger may be in a high temperature and high pressure state. Since the mesh made of metal is excellent in chemical resistance and corrosion resistance, the filter 135 may have a long life.

FIG. 11 is a diagram illustrating various examples of a pressure sensor 180 included in a fluid cleaning apparatus 100 of the present disclosure.

The fluid cleaning apparatus 100 may include a pressure sensor 180. The pressure sensors 180 are installed in both sides of the rotating wheel 130, respectively, to measure the pressure of the first fluid or the second fluid.

Referring to FIG. 11A, the pressure sensor 180 may include a first pressure sensor 180a and a second pressure sensor 180b. The first pressure sensor 180a is disposed in one side of the housing 170 to measure the pressure in the first A volume 140a through which the first fluid flows into the housing 170, and the second pressure sensor 180b is disposed in the other side of the housing 170 to measure the pressure in the second A volume 150a through which the second fluid is discharged from the housing 170.

Meanwhile, referring to FIG. 11B, the first pressure sensor 180a is disposed in one side of the housing 170 to measure the pressure in the first A volume 140a through which the first fluid flows into the housing 170, and the second pressure sensor 180b is disposed in the other side of the housing 170 to measure the pressure in the first B volume 140b through which the first fluid is discharged through the first outlet 115 after passing through the rotating wheel 130.

FIG. 12 is a diagram illustrating a controller 190 included in a fluid cleaning apparatus 100 of the present disclosure.

The fluid cleaning apparatus 100 may include the controller 190. The controller 190 may transmit and receive pressure-related information of the fluid cleaning apparatus 100 to/from a pressure sensor 180, a server 800, and a manager terminal 900.

The controller 190 may receive a pressure value measured by the pressure sensor 180 from the pressure sensor 180. In addition, the controller 180 may calculate a pressure difference from pressure values of both sides of the rotating wheel 130 measured by the pressure sensor 180.

Specifically, the controller 180 may calculate a pressure difference between the pressure value in the first A volume 140a measured by the first pressure sensor 180a and the pressure value in the second A volume 150a measured by the second pressure sensor 180b. Alternatively, the controller 180 may calculate a pressure difference between the pressure value in the first A volume 140a measured by the first pressure sensor 180a and the pressure value in the first B volume 140b measured by the second pressure sensor 180b.

When the pressure difference is greater than or equal to a preset value, the controller 180 may generate an alarm signal and transmit to the control server 800 or the manager terminal 900. When the pressure difference is greater than or equal to a certain value, the amount of the foreign matter A that is fixed to the filter 135 and does not separated is large. Accordingly, the controller 180 may transmit the alarm signal.

Meanwhile, the pressure difference reference value for transmitting the alarm signal may have a plurality of values.

The alarm signal may include filter 135 replacement guide information or filter 135 cleaning guide information. Accordingly, the manager may check the state of the filter 135 and prevent the decrease in the cleaning performance of the fluid cleaning apparatus 100.

FIG. 13 is a diagram illustrating a detailed configuration of the controller 190 of FIG. 12.

Referring to FIG. 13, the controller 190 may include a processor 191, a storage unit 192, a communication unit 193, an A/D converter 194, and an interface board 195.

Meanwhile, the block diagram of the controller 190 shown in FIG. 13 is a block diagram for an embodiment of the present disclosure. Each component of the block diagram may be integrated, added, or omitted according to the specification of the controller 190 that is actually implemented.

The processor 191 may calculate a pressure difference from pressure values of both sides of the rotating wheel 130 measured by the pressure sensor 180. Meanwhile, the processor 191 may control the overall operation of the chiller 2 including the fluid cleaning apparatus 100. To this end, the processor 191 may execute a control algorithm. The control algorithm may be implemented as a computer program and executed by the processor 191, which is a technology that is obvious to those skilled in the art.

The storage unit 192 may store an algorithm for calculating a pressure difference and information on a pressure difference reference value. The pressure difference calculation algorithm may be configured as a computer program or software and stored in the storage unit 192.

The storage unit 192 may include at least one type of storage medium among a flash memory type, a hard disk type, a multimedia card micro type, a card type memory (e.g., SD or XD memory, etc.), Random Access Memory (RAM), Static Random Access Memory (SRAM), Read Only Memory (ROM), Electrically Erasable Programmable Read Only Memory (EEPROM), Programmable Read Only Memory (PROM), magnetic memory, magnetic disk, and optical disk.

The A/D converter 194 may convert an analog signal received from various sensors inside the chiller 2 including the pressure sensor 180 into a digital signal. The digital signal converted by the A/D converter 194 may be provided to the processor 191.

The interface board 195 may receive signals from various sensors and components in association with the operation of the chiller 2. For example, the interface board 194 may receive at least one of pressure information measured by the pressure sensor 180 of the fluid cleaning apparatus 100, temperature information of cold water discharged from the evaporator 400 to the cold water inflow tube 421, cooling pressure information of the evaporator 400 and the condenser 200, discharge temperature sensor information of the compressor 100, oil temperature sensor information of the compressor 100, or gap sensor information of the compressor 100.

The processor 191 may control a display (not shown) to output an alarm signal when the pressure difference is greater than or equal to a preset value.

The communication unit 193 may communicate with the control server 800 or the manager terminal 900 to transmit and receive information.

Meanwhile, the processor 191 may output an alarm signal to the display when the pressure difference is greater than or equal to a first set value, may transmit the alarm signal to the control server 800 or the manager terminal 900 through the communication unit 193, when the pressure difference is greater than or equal to a second set value, and may stop the operation of the chiller 2 to output an alarm signal to the display or to transmit an alarm signal to the control server 800 or the manager terminal 900, when the pressure difference is greater than or equal to a third set value.

Accordingly, it is possible to prevent a decrease in the cleaning performance of the fluid cleaning apparatus 100.

Meanwhile, the storage unit 192 may accumulate and store pressure information measured by the pressure sensor 180, and the processor 191 may calculate a change trend of the pressure difference based on the accumulated and stored information to determine an expected replacement time or a cleaning required time, and previously transmit an alarm signal including expected replacement information or cleaning required information to the control server 800 or the manager terminal 900.

The fluid cleaning apparatus 100 and the chiller 2 including the same according to the present disclosure are not limited to the configuration and method of the embodiments described above, but the above embodiments may be configured by selectively combining all or part of each of the embodiments so that various modifications can be achieved.

According to the present disclosure, there are the following effects.

In the fluid cleaning apparatus according to an embodiment of the present disclosure, foreign matter filtered by the filter is discharged again through the outlet while the wheel including the filter rotates, thereby preventing accumulation of foreign matter in the heat exchanger.

In addition, the fluid cleaning apparatus according to an embodiment of the present disclosure has an effect of increasing the replacement cycle or lifespan of the filter by allowing foreign matter filtered by the filter to be discharged again through the outlet while the wheel including the filter rotates.

In addition, the fluid cleaning apparatus according to an embodiment of the present disclosure has an effect of preventing a decrease in the efficiency of a heat exchanger product by allowing the wheel to rotate without additional power due to the flow of the introduced fluid and the discharged fluid.

In addition, the fluid cleaning apparatus according to an embodiment of the present disclosure has an effect of easy management by adding only a rotating wheel and a filter having a simple structure.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A fluid cleaning apparatus comprising:
   a first volume comprising a first inlet through which a first fluid is introduced and a first outlet through which the first fluid is discharged;
   a second volume comprising a second inlet through which a second fluid is introduced and a second outlet through which the second fluid is discharged; and
   a rotating wheel which is provided with a filter for filtering the first fluid, and rotatably positioned within the first volume and the second volume in a direction perpendicular to a flow direction of the first fluid or the second fluid,
   wherein foreign matter filtered while the first fluid passes through the filter in the first volume is discharged through the second outlet while the second fluid passes through the filter in the second volume, as the rotating wheel rotates.

2. The fluid cleaning apparatus of claim 1, wherein the rotating wheel rotates by a flow of a fluid introduced into the first inlet and discharged through the first outlet and a flow of a fluid introduced into the second inlet and discharged through the second outlet.

3. The fluid cleaning apparatus of claim 1, wherein the rotating wheel comprises a first wheel and a second wheel having a disk-shape in which a plurality of holes are formed,
   wherein the filter is located between the first wheel and the second wheel.

4. The fluid cleaning apparatus of claim 3, wherein the plurality of holes are formed in a diagonal direction with respect to a flow direction of the first fluid or the second fluid.

5. The fluid cleaning apparatus of claim 1, further comprising a cutwater plate which is formed in both sides of the rotating wheel in a direction in which the first fluid and the second fluid flow, and partitions the first volume and the second volume.

6. The fluid cleaning apparatus of claim 5, wherein the cutwater plate comprises a first partition wall partitioning a space in which the first inlet and a second outlet are located, and a second partition wall partitioning a space in which the first outlet and the second inlet are located,
   wherein the first partition wall is disposed closer to the second outlet than the first inlet, and
   the second partition wall has one end disposed in the same position as the first partition wall, and the other end that is bent so that the first outlet and the second inlet have a same area.

7. The fluid cleaning apparatus of claim 1, wherein a first area in which the rotating wheel is located in the first volume has a larger area than a second area in which the rotating wheel is located in the second volume.

8. The fluid cleaning apparatus of claim 7, further comprising a shielding plate configured to cover a part of the second area of the rotating wheel.

9. The fluid cleaning apparatus of claim 8, wherein the first area in which the rotating wheel is located in the first volume and a second area in which the filter is located in the second volume have a same area.

10. The fluid cleaning apparatus of claim 1, wherein the filter is a mesh filter made of a metal, and the metal is any one of stainless steel, aluminum, copper, tungsten, iron, and titanium.

11. The fluid cleaning apparatus of claim 1, wherein the filter comprises at least one mesh layer in which a plurality of filtering holes are formed, and
    a diameter of the filtering hole is different for each mesh layer.

12. The fluid cleaning apparatus of claim 11, wherein the at least one mesh layer is stacked so as to be closer to the first inlet and the second outlet as the diameter of the filtering hole becomes smaller, and to be closer to the second inlet and the first outlet as the diameter of the filtering hole becomes larger.

13. The fluid cleaning apparatus of claim 1, wherein the first outlet is connected to a cold water inflow tube or cooling water inflow tube of a heat exchanger, and the second inlet is connected to a cold water discharge tube or cooling water discharge tube of the heat exchanger.

14. The fluid cleaning apparatus of claim 1, further comprising a pressure sensor installed in both sides of the rotating wheel, respectively, to measure a pressure of the first fluid or the second fluid.

15. The fluid cleaning apparatus of claim 14, further comprising a controller for calculating a pressure difference from a pressure value of both sides of the rotating wheel measured by the pressure sensor,
    wherein the controller generates an alarm signal when the pressure difference is greater than or equal to a preset value, and transmits to a control server or a manager terminal.

16. A heat exchanger comprising the fluid cleaning apparatus,
    wherein the fluid cleaning apparatus comprising:
    a first volume comprising a first inlet through which a first fluid is introduced and a first outlet through which the first fluid is discharged;
    a second volume comprising a second inlet through which a second fluid is introduced and a second outlet through a rotating wheel which is provided with a filter for filtering the first fluid, covers the first volume and the second volume in a first direction, and rotates about a rotation shaft parallel to the first direction; and a plurality of holes formed by penetrating the rotating wheel, wherein the plurality of holes extend in a direction between the first direction and a second direction perpendicular to the first direction.

17. A fluid cleaning apparatus comprising:

a first volume comprising a first inlet through which a first fluid is introduced and a first outlet through which the first fluid is discharged;

a second volume comprising a second inlet through which a second fluid is introduced and a second outlet through which the second fluid is discharged;

a rotating wheel which is provided with a filter for filtering the first fluid, covers the first volume and the second volume in a first direction, and rotates about a rotation shaft parallel to the first direction; and a plurality of holes formed by penetrating the rotating wheel, wherein the plurality of holes extend in a direction between the first direction and a second direction perpendicular to the first direction.

18. The fluid cleaning apparatus of claim 17, wherein an angle formed by the plurality of holes with respect to the first direction is between 20 degrees and 45 degrees.

19. The fluid cleaning apparatus of claim 17, wherein the rotating wheel comprises a first wheel and a second wheel in which the plurality of holes are formed, and the filter is located between the first wheel and the second wheel.

20. A chiller comprising:

a compressor for compressing a refrigerant;

a condenser condensing the compressed refrigerant;

an expander for expanding the condensed refrigerant; and an evaporator for evaporating the expanded refrigerant, wherein at least one of the condenser or the evaporator is configured of the heat exchanger of claim 16.

* * * * *